(12) United States Patent
Frederiksen et al.

(10) Patent No.: US 9,897,345 B2
(45) Date of Patent: Feb. 20, 2018

(54) MOUNTING SUPPORT FOR AT LEAST ONE SOLAR THERMAL COLLECTOR

(71) Applicant: Savo-Solar Oy, Mikkeli (FI)

(72) Inventors: Torben Frederiksen, Odsense SV (DE); Mads Nordvig Nielsen, Svendborg (DK)

(73) Assignee: SAVO-SOLAR OY, Mikkeli (FI)

( * ) Notice: Subject to any disclaimer, the term of this patent is extended or adjusted under 35 U.S.C. 154(b) by 0 days.

(21) Appl. No.: 14/884,085

(22) Filed: Oct. 15, 2015

(65) Prior Publication Data

US 2016/0109159 A1   Apr. 21, 2016

(30) Foreign Application Priority Data

Oct. 16, 2014   (FR) .................................... 20 145908

(51) Int. Cl.
*F24J 2/52* (2006.01)

(52) U.S. Cl.
CPC ........... *F24J 2/5266* (2013.01); *F24J 2/5232* (2013.01); *F24J 2/5254* (2013.01); *F24J 2/5264* (2013.01); *F24J 2002/5281* (2013.01); *F24J 2002/5283* (2013.01); *Y02E 10/47* (2013.01)

(58) Field of Classification Search
CPC  F24J 2/5201; F24J 2/523; F24J 2/5232; F24J 2/5254; F24J 2/5264; F24J 2/5266; F24J 2002/5273; F24J 2002/5281; F24J 2002/5283
USPC ............................................... 211/13.1, 41.1
See application file for complete search history.

(56) References Cited

U.S. PATENT DOCUMENTS

| 8,250,829 B2* | 8/2012 | McPheeters ........ E04D 13/1476 |
| | | 136/244 |
| 2006/0086382 A1* | 4/2006 | Plaisted ................. F24J 2/5207 |
| | | 136/244 |
| 2008/0121273 A1* | 5/2008 | Plaisted .................. F16L 3/127 |
| | | 136/251 |
| 2011/0067691 A1 | 3/2011 | Bellacicco et al. |
| 2011/0233157 A1* | 9/2011 | Kmita .................... F24J 2/5233 |
| | | 211/41.1 |
| 2012/0223033 A1* | 9/2012 | Molek ...................... F16B 7/18 |
| | | 211/41.1 |

(Continued)

FOREIGN PATENT DOCUMENTS

| CN | 102052795 | * | 1/2011 |
| DE | 102005030039 A1 * | 1/2007 | ............... F24J 2/523 |

(Continued)

OTHER PUBLICATIONS

Finnish Search Report, dated May 12, 2015, from corresponding Finnish Application.

(Continued)

*Primary Examiner* — Joshua E Rodden
(74) *Attorney, Agent, or Firm* — Young & Thompson

(57) ABSTRACT

A mounting support (100) for at least one solar thermal collector (110*a*) includes a vertical support part (120) having a bottom end (122) and a top end (124). The bottom end is configured to be mounted into a ground or a mounting base. The support further including a horizontal support part (140) configured to support the at least one collector and to enable to slide the supported at least one collector along the horizontal support part for mounting the at least one collector.

17 Claims, 4 Drawing Sheets

(56) References Cited

U.S. PATENT DOCUMENTS

| | | | |
|---|---|---|---|
| 2013/0048815 A1* | 2/2013 | Wagner | F24J 2/5207 248/228.1 |
| 2013/0048816 A1* | 2/2013 | Wentworth | F24J 2/5207 248/237 |
| 2013/0340358 A1* | 12/2013 | Danning | B23P 11/00 52/126.7 |
| 2013/0340380 A1* | 12/2013 | Danning | B23P 11/00 52/705 |
| 2014/0008312 A1 | 1/2014 | Durney et al. | |
| 2014/0041706 A1* | 2/2014 | Haddock | F24J 2/5258 136/244 |
| 2014/0069483 A1* | 3/2014 | Wolter | H01L 31/0422 136/246 |
| 2014/0101940 A1 | 4/2014 | Schuit et al. | |
| 2014/0224325 A1* | 8/2014 | Stoddard | H02S 30/10 136/259 |
| 2014/0252195 A1* | 9/2014 | Maresca | F24J 2/5232 248/371 |
| 2015/0101654 A1* | 4/2015 | Pantel | F16M 13/02 136/251 |

FOREIGN PATENT DOCUMENTS

| | | | | |
|---|---|---|---|---|
| DE | 102007020234 A1 | * | 10/2008 | ............. F24J 2/5232 |
| DE | 102011017467 | * | 4/2011 | |
| DE | 202013103076 U1 | * | 8/2013 | ............. F24J 2/5205 |
| DE | 102013007406 A1 | * | 11/2014 | ............... F24J 2/523 |
| DE | 20303257 U1 | | 6/2017 | |
| EP | 2 554 925 A2 | | 2/2013 | |
| FR | 2981738 A1 | * | 4/2013 | ............. F24J 2/0427 |
| WO | 2011/045185 A2 | | 4/2011 | |

OTHER PUBLICATIONS

Sep. 29, 2017, FI communication issued for related FI application No. 20145908.

* cited by examiner

MOUNTING SUPPORT FOR AT LEAST ONE SOLAR THERMAL COLLECTOR

TECHNICAL FIELD

The application relates generally to a mounting support for at least one solar thermal collector.

BACKGROUND

Large area solar thermal collectors with maximum dimensions of many meters are installed on an installation area, wherein adjacent collectors form rows and the installation area comprises a number of adjacent collector rows.

Each self-supported collector is typically installed by means of two installation supports and each support comprises a vertical support pile and an inclined support pile. Lower ends of the vertical and inclined piles are attached to a concrete base or rammed into a ground, and the upper ends are attached to each other so that the base and piles form a triangle. The vertical pile raises an upper edge of a collector and the inclined pile supports a back side of the collector, when the back side leans on it, and provides a desired inclination for the collector.

A collector is lifted directly in its position on the supports, which are arranged on the ground so that the inclined piles locate usually approx. ¼ from each collector side, and attached to the piles. The supports are installed at high pace so that it is difficult for a vehicle with a crane to move between the supports and it needs an extra caution and work to position collectors on the supports.

The adjacent and positioned collectors are connected to each other by corner-to-corner connections, which are provided by 180 degrees bended external flexible metal hoses, whereupon a minimum space between collectors can be approx. 150-200 mm because of the characteristic of the hoses and collector alignment tolerances. The hoses provides external compensation for thermal expansion, but those need a dedicated external hose insulation and protection material.

SUMMARY

One object of the invention is to withdraw the above-mentioned drawbacks and provide a mounting support for at least one solar thermal collector.

One object of the invention is fulfilled by providing a mounting support, a method, and a mounting system.

One embodiment of the invention is a mounting support for at least one solar thermal collector. The support comprising a vertical support part comprising a bottom end and a top end. The bottom end is configured to be mounted into a ground or a mounting base. The support further comprising a horizontal support part configured to support the at least one collector and to enable to slide the supported at least one collector along the horizontal support part for mounting the at least one collector.

The term "hydraulic connection tube(s)" refers to hydraulic connection means, which can be e.g. a tube, hose, or any other hollow, elongated element (body) that can be used for conveying heat transport fluids used in solar thermal collectors. The means are made of e.g. at least one of the following materials: metal, plastic, and rubber.

One embodiment of the invention is a method for mounting at least one solar thermal collector on a mounting support. The support comprising a vertical support part comprising a bottom end and a top end. The bottom end is configured to be mounted into a ground or a mounting base. A horizontal support part is configured to support the at least one collector. The method comprising sliding the supported at least one collector along the horizontal support part for mounting the at least one collector.

One embodiment of the invention is a mounting system comprising mounting supports. Each support comprising a vertical support part comprising a bottom end and a top end. The bottom end is configured to be mounted into a ground or a mounting base. A horizontal support part is configured to support the at least one collector and to enable to slide the supported at least one collector along the horizontal support part for mounting the at least one collector. The system comprising a lower mounting support and an upper mounting support. The lower mounting support is configured to support a lower part of at least one inclined solar thermal collector and the second mounting support is configured to support an upper part of the at least one inclined solar thermal collector.

Further embodiments of the invention are defined in dependent claims.

The verb "to comprise" is used in this document as an open limitation that neither excludes nor requires the existence of also unrecited features. The verbs "to include" and "to have/has" are defined as to comprise.

The terms "a", "an" and "at least one", as used herein, are defined as one or more than one and the term "plurality" is defined as two or more than two.

The term "another", as used herein, is defined as at least a second or more.

The term "or" is generally employed in its sense comprising "and/or" unless the content clearly dictates otherwise.

For the above-mentioned defined verbs and terms, these definitions shall be applied, unless a different definition is given in the claims or elsewhere in this description.

Finally, the features recited in depending claims are mutually freely combinable unless otherwise explicitly stated.

BRIEF DESCRIPTION OF THE FIGURES

The embodiments of the invention will be described with reference to the accompanying figures, in which.

DETAILED DESCRIPTION OF THE FIGURES

Figure 1A:
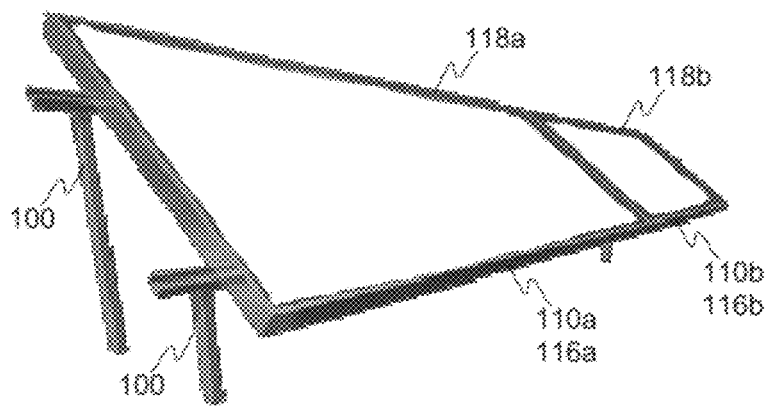
FIGS. 1a-1e illustrates a T-shaped mounting support and a sliding of a solar thermal collector along the support during a mounting.

FIG. 1a illustrates two adjacent large area solar thermal collectors 110a, 110b on a ground or elsewhere mounted by means of lower (first) and upper (second) T-shaped mounting supports 100, which provides an improved mechanical support for the collectors 110a, 110b.

The lower supports 100 are configured to support lower parts 116a, 116b of the collectors 110a, 110b and the upper supports 100, for one, are configured to support upper parts 118a, 118b.

The use of the supports 100 reduces a number of required supports by repositioning them to a far side of each collector 110a, 110b and, hereby enabling that each support 100 can be shared by two adjacent collectors 110a, 110b.

Figure 1B:
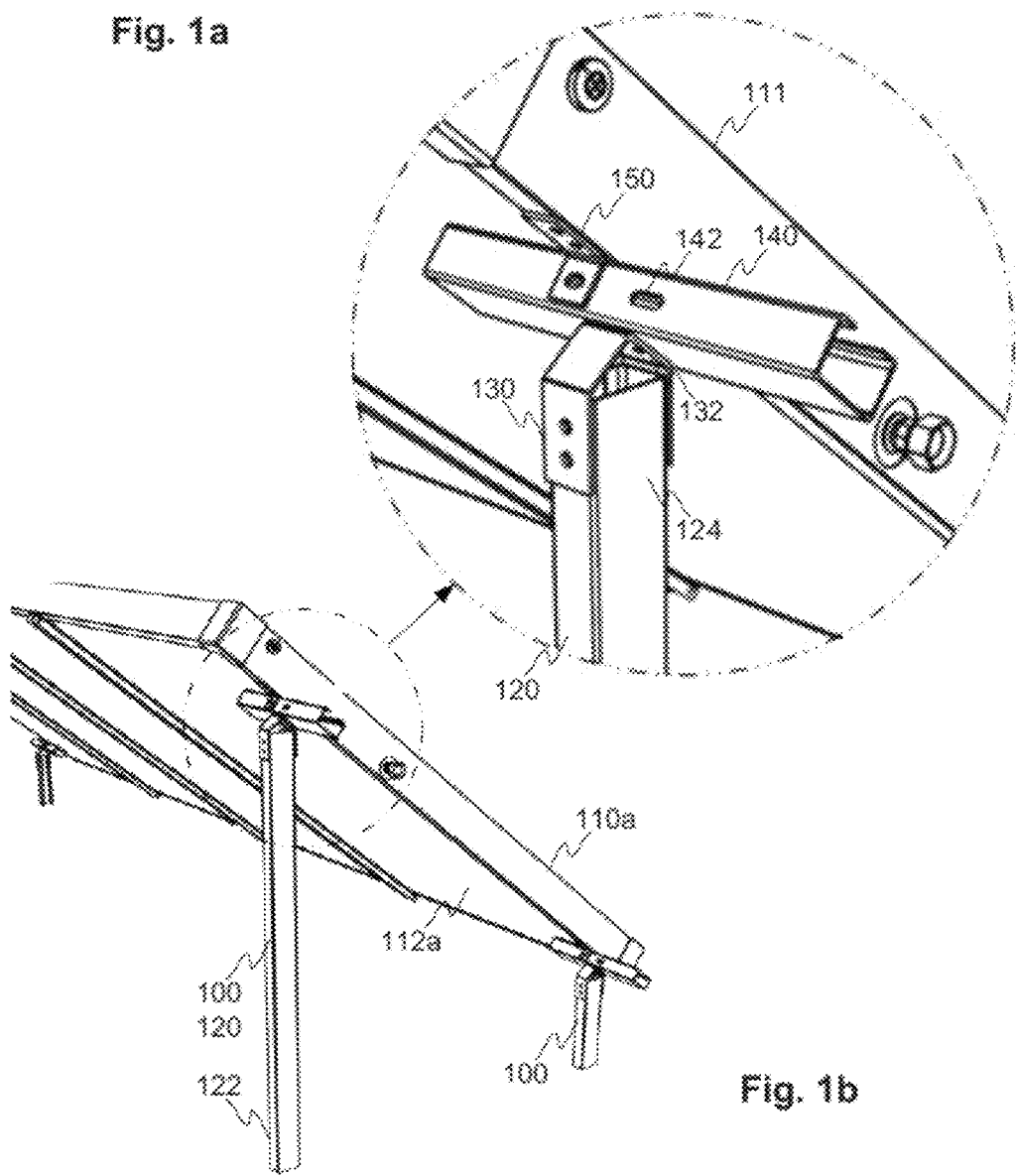

FIG. 1b illustrates details of the mounting support 100, which can be made of metal parts 120, 130, 140, e.g. stainless or galvanized steel parts.

The support 100 comprises a C-shaped, I-shaped or other type of vertical support part 120 that has a bottom end 122 and a top end 124. The bottom end 122 is configured to be mounted into the ground or a mounting base e.g. a concrete or metal base.

The support 100 further comprises an inclination part 130, which is attached to the top end 124. It comprises an inclined surface 132 to which a C-shaped, I-shaped of other type of horizontal support part 140 is attached in order to form the T-shaped support 100. It is possible to use more than one parts 120 to support the part 140.

Figure 1C:
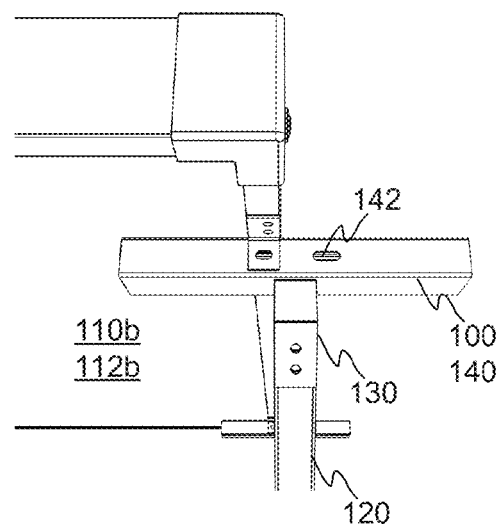

FIG. 1c illustrates one collector 110b that is mounted on the support 100. The support 100 can be e.g. a shared support, which can support e.g. two collectors 110a, 110b.

Figure 1D:
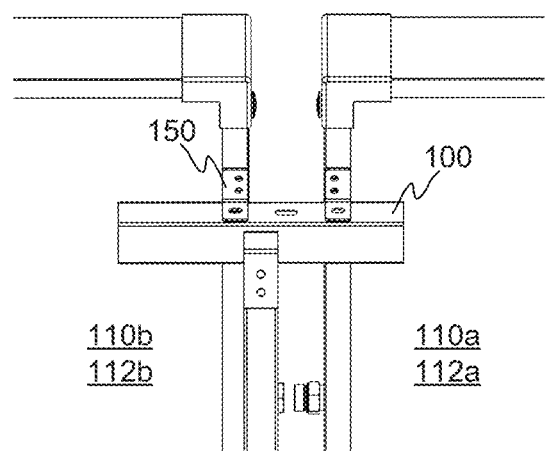
Figure 1E:
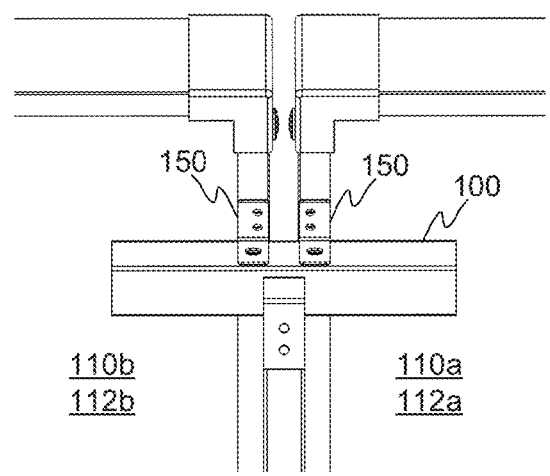

The part 140 is configured to support the collector(s) 110a, 110b and enables to slide one supported collector 110a—after it has been lifted on the supports 100 as FIG. 1d illustrates—along the part 140 in a horizontal direction e.g. towards the supported collector 110b in order to mount the collector(s) 110a, 110b according to FIG. 1e. The mounted collector(s) 110a, 110b is inclined according to the inclined surface 132.

Figure 2A:
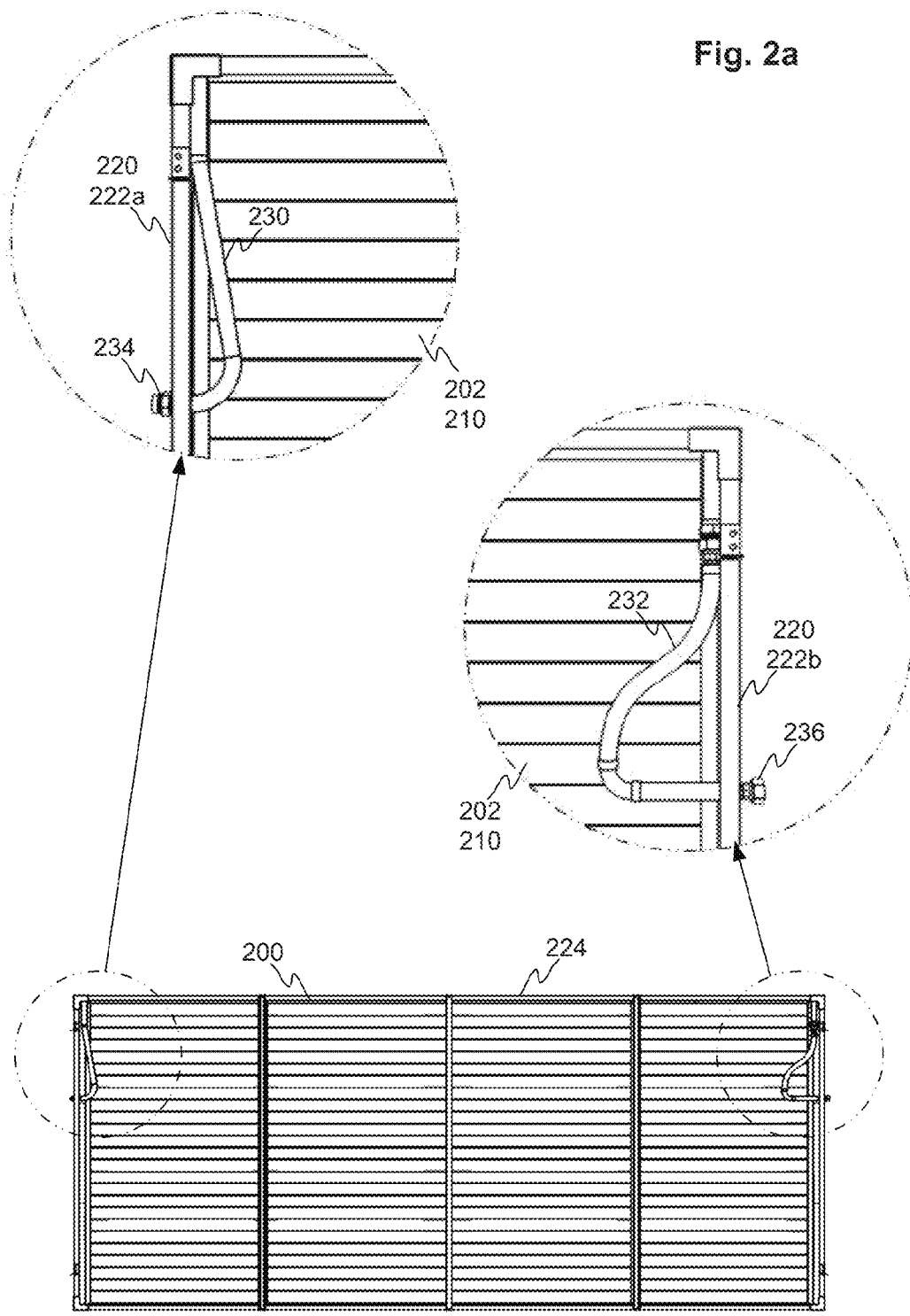
FIGS. 2a-2c illustrates a flexible hydraulic connection tubes.
Figure 2B:
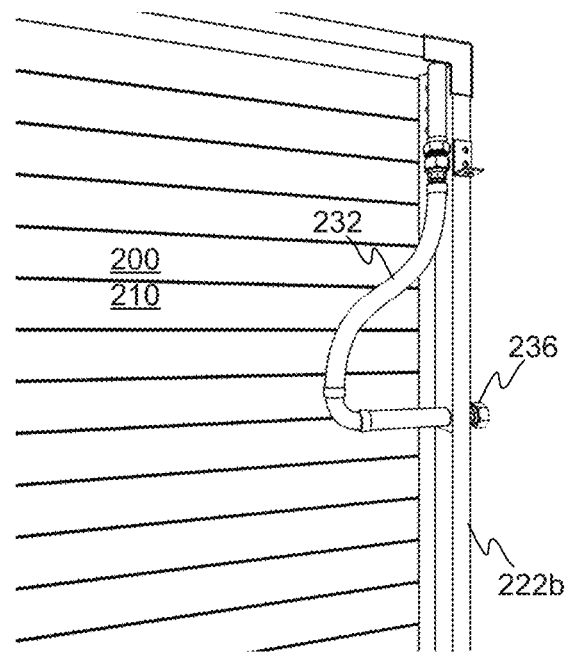
Figure 2C:
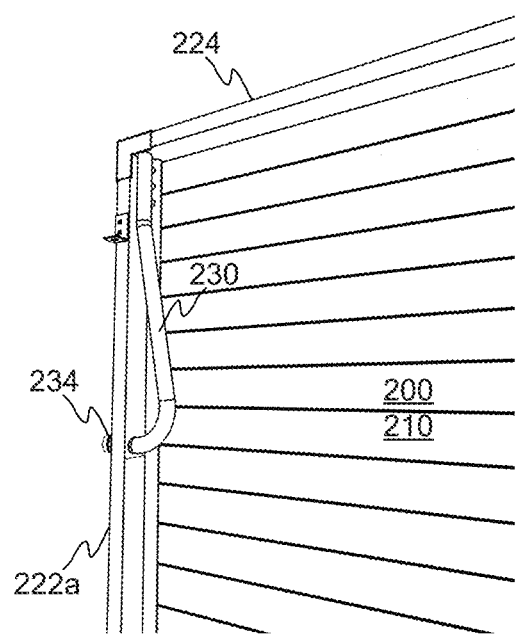

The supported and positioned collectors 110a, 110b are connected to each other by means of a hydraulic connection illustrated in FIGS. 2a-2c.

With the sufficiently flexible hydraulic connection, it is possible to make an ultra-short, e.g. approx. 20-40 mm, collector-to-collector mounting distance, which together with the shared support 100 provides a significantly, e.g. almost 50%, reduced number of piles.

The supported collector(s) 110a, 110b is attached to the part 140, which comprises at least one mounting hole 142, e.g. at least one elongated hole, by means of attaching means 150, which comprise e.g. an attaching support (attaching bracket) 150, e.g. an L-shaped steel plate (bracket), and a screw-nut combination for each support 150.

The support(s) 150 is installed on a back side 112a, 112b of the supported collector(s) 110a, 110b, e.g. on side frames (side walls) of a collector frame 111, and attached by the screw-nut combination(s) through the hole 142. The elongated hole(s) 142 and the screw-nut attachment(s) allow to slide the supported collector(s) 110a, 110b even after some tensioning of the screw-nut combination(s) e.g. to allow for some expansion of the collector(s) 110a, 110b. The support(s) 150 prevents a movement of the supported collector 110a, 110b in an inclination direction.

The T-shaped supports 100 ensure good alignment between the adjacent collectors 110a, 110b in a row since there is no need for e.g highly adjustable brackets.

In addition, the supports 100 provides nice visual appearance when the collector row can easily be made to smoothly follow the height profile of the ground.

In addition, the collector row with multiple collectors 110a, 110b will in practice appear like one long collector surface, which facilitates a collector glass cleaning, especially if the cleaning is automated.

FIG. 2a illustrates a back side 202 of a large area solar thermal collector 200, which can be used e.g in district heating systems.

The collector 200 comprises an absorber 210 for absorbing solar radiation. The absorber 210 comprises a heat transport channel for a heat transport fluid and it—as well as some other parts of the collector 200—is covered by a collector frame 220. The heat transport channel comprises an internal access (an internal inlet) and an internal exit (an internal outlet) inside the collector 200.

The frame 220 comprises an access hole (an inlet hole) and an exit hole (an outlet hole), which enable the hydraulic connection 230, 232 between the heat transport channel and other heat transport channels. The access and exit holes in the frame 220 can be either aligned or offset from the internal access and exit on the absorber 210. The access and exit holes can be located e.g. in a middle of side frames (side walls) 222a, 222b of the frame 220 and the internal access and exit can be located e.g. in corners of the frame 220 as FIGS. 2a-2c illustrate.

The collector 200 does not have significant external connections, whereupon there is no shadow effect on a next collector row behind from the hydraulic connections 230, 232, which improves a field efficiency/production.

In addition, a wind load on the collector row under stormy conditions is reduced, because of the absence of the significant external connections, which eases requirements on the mechanical support system.

In addition, a highest part of the installation is a top frame (top wall) 224, which eases an integration with the landscape and promotes an approval of new solar fields.

In addition, the offsets removes a need for having the hydraulic connection 230, 232 (access and exit holes) near collector corners, which reduces mechanical weakening of the corners, when the internal access and exit in upper corners of the absorber 210 are maintained. This provides no issues with captured air during filling of the absorber 210.

In addition, the height of the hydraulic connection 230, 232 is reduced to approx. 1.5 m over the ground from approx. 2 m, which provides easy reach for a normal person and improves work ergonomics during the mounting of the hydraulic connections 230, 232.

Alternatively, it is possible that the access and exit holes locate in e.g. the top frame 224 or anywhere else of the collector 200.

The hydraulic connection 230, 232 is provided by means of integrated hydraulic connection tubes 230, 232 that connect the heat transport channel and the other heat transport channels, e.g. a heat transport channel of another collector 200, through the access and exit holes. The tubes 230, 232 are installed at least partly inside the collector 200 and at least one of the tubes 230, 232 comprises a flexible part (is flexible) inside the collector 200, whereupon it can be bended inside the collector 200.

One of the tubes 230, 232 can be an inflexible tube, whereupon other one of the tubes 230, 232 comprises at least one flexible part, which is at least partly inside the collector 200, or it is completely flexible. Alternatively, each tube 230, 232 in the collector can be partly flexible—so that at least a part of a flexible part is inside the collector 200—or completely flexible.

The integration of the tubes 230, 232 provides an improved insulation by use of existing collector insulation (increased thermal resistance), whereupon power loss is reduced.

In addition, the integration of tubes 230, 232 reduces a need for tube bending, which significantly reduces a collector row pressure drop, increases maximum possible length of collector rows, which for one reduces a field installation cost, eases requirements on pressure rating of a field pump, and reduces electrical energy consumption by the field pump.

At least one of the tubes 230, 232 can be flexible outside the frame 220 and the collector 200, whereupon it is possible to bend the tube(s) 230, 232 during the connection to the other heat transport channels. So, the tube(s) 230, 232 can be a flexible metal and/or plastic tube (hose) 230, 232 at least partly.

The integrated tube(s) 230, 232 reduces tube bending, whereupon a flexible tube installation is now with reduced mechanical loading of the tubes (hoses) 230, 232.

The tube 230 comprises an inlet connection adapter 234 and the tube 232 comprises an outlet connection adapter 236 for connecting the tubes 230, 232, or vice versa, so that the adapter 236 of one collector 200 is connected to its counterpart, i.e. the adapter 234 of the another collector 200 (heat transport channel), and so on.

The tubes 230, 232 provides only one connection point per the collector 200 instead of two, whereupon it reduces significantly an installation time when the interconnection between the collectors 200 is simple: the collector mounting and hydraulic connection is now a single step operation. It is also possible to realize solutions, which comprises two connections of similar types, e.g. two of the tube 230 or the tube 232.

In addition, the tubes 230, 232 between the side frames 222a, 222b provides an easier handling of thermal expansion when a full worst case absorber expansion can be handled largely without mechanical loading of the absorber 210.

In addition, the collector 200 enables in-production tube test, when only one field-tested adapter connection per the collector 200. Thus, fewer in-field connections are required and, so, the risk of in-field introduced connection leaks is reduced.

The adapter(s) 234, 236 comprises a transport position for protecting the adapter(s) 234, 236 during transportation. The adapter(s) 234, 236 is pulled out from the transport position for the hydraulic connection 230, 232 and pushed back fully or partly into the collector 200 during its connection.

The integrated tubes 230, 232 enables together with the T-shaped supports 100 an ultra-short distance, approx. 20-40 mm, between the adjacent collector 200 by the increased mechanical flexibility of the hydraulic connection 230, 232.

Due to the short collector distance, minimal fraction of the hydraulic connection 230, 232 is exposed to an ambient temperature, which also provides the reduced power loss.

In addition, tubes 230, 232 provides an increased collector field power density.

In addition, tubes 230, 232 provides an improved and uniform overall visual appearance by absence of visual external hydraulic connection above the collectors 200. The visual appearance is now similar to that of widely used large scale photovoltaic (PV) installations, whereupon a seamless visual integration with PV installations is possible.

The invention has been now explained above with reference to the aforesaid embodiments and the several advantages of the invention have been demonstrated. It is clear that the invention is not only restricted to these embodiments, but comprises all possible embodiments within the scope of the invention thought and the following claims.

The invention claimed is:
1. A mounting support for at least one large area solar thermal collector, comprising
a vertical support part and
a horizontal support part configured to support the at least one collector,
wherein the vertical support part comprises a bottom end and a top end, and
wherein the bottom end is configured to be mounted into a ground or a mounting base,
the support further comprises
an inclination part to which the horizontal support part is attached in order to form a T-shaped support,
wherein the inclination part is attached to the top end of the vertical support part,
wherein two large area solar thermal collectors are possible to support directly on the inclined horizontal support part,
wherein the inclined horizontal support part enables to slide a supported large area solar thermal collector along the horizontal support part for mounting the at least one collector,
wherein the horizontal support part enables to slide the supported collector along the horizontal support part towards another supported collector for connecting the supported collectors to each other,
wherein an attaching device is used to attach the supported collector to the horizontal support part, and
wherein the horizontal support part comprises at least one elongated mounting hole that allows to slide the supported collector after some tensioning of the attaching device.

2. The support of claim 1, wherein the support is a shared support, which comprises the horizontal support configured to support two collectors.

3. The support of claim 2, wherein the supported collector and the another supported collector are connected to each other by means of a hydraulic connection.

4. The support of claim 2, wherein the attaching device comprises at least one attaching support.

5. The support of claim 2, wherein the horizontal support part is inclined for mounting the at least one collector so that the collector is inclined.

6. The support of claim 2, wherein the inclination part is attached to the top end of the vertical support part, wherein the inclination part comprises an inclined surface to which the horizontal support part is attached.

7. The support of claim 2, wherein at least one attaching support is configured to be installed on a back side of the supported collector and to prevent a movement of the supported collector in an inclination direction.

8. The support of claim 2, wherein the two collectors are separated by a distance of approximately 20 to 40 mm.

9. The support of claim 1, wherein the supported collector and the another supported collector are connected to each other by means of a hydraulic connection.

10. The support of claim 1, wherein the attaching device comprises at least one attaching support.

11. The support of claim 10, wherein the attaching support is an L-shaped steel bracket.

12. The support of claim 1, wherein the horizontal support part is inclined for mounting the collector so that it is inclined.

13. The support of claim 1, wherein the inclination part comprises an inclined surface to which the horizontal support part is attached.

14. The support of claim 1, wherein an at least one attaching support is configured to be installed on a back side of the supported collector and to prevent a movement of the supported collector in an inclination direction.

15. The support of claim 1, wherein the horizontal support part is C-shaped or I-shaped with an open top.

16. A method for mounting at least one large area solar thermal collector on a mounting support comprising
a vertical support part,
a horizontal support part configured to support the at least one collector, and an inclination part to which the horizontal support part is attached in order to form a T-shaped support, wherein the vertical support part comprises a bottom end and a top end, wherein the bottom end is configured to be mounted into a ground or a mounting base, wherein the inclination part is attached to the top end of the vertical support part, and wherein two large area solar thermal collectors are possible to support directly on the inclined horizontal support part, the method comprising:

supporting the two collectors directly on the horizontal support part;

using an attaching device to attach the supported collector to the horizontal support part; and sliding one of the two supported collectors at least one collector along the horizontal support part for mounting the at least one of the supported two collectors, whereupon the one of the supported collectors slides along the horizontal support part towards another of the two supported collectors for connecting the two supported collectors to each other, wherein the supported collector is allowed to slide after some tensioning of the attaching device by means of at least one elongated mounting hole of the horizontal support part.

17. A mounting system for large area solar thermal collectors comprising upper and lower mounting supports, wherein each mounting support comprises a vertical support part, a horizontal support part configured to support the at least one collector, and an inclination part to which the horizontal support part is attached in order to form a T-shaped support, wherein the vertical support part comprises a bottom end and a top end, wherein the bottom end is configured to be mounted into a ground or a mounting base, wherein the inclination part is attached to the top end of the vertical support part, wherein two large area solar thermal collectors are possible to support directly on the inclined horizontal support part, wherein the inclined horizontal support part enables to slide a supported large area solar thermal collector along the horizontal support part for mounting the collector, and whereupon the one of the supported collectors slides along the horizontal support part towards another of the two supported collectors for connecting the two supported collectors to each other, the system comprising the lower mounting support and the upper mounting support, the lower mounting support is configured to support a lower part of the two inclined collectors, and the upper mounting support is configured to support an upper part of the two inclined collectors, wherein an attaching device is used to attach the supported collector to the horizontal support part, and wherein the horizontal support part comprises at least one elongated mounting hole that allows to slide the supported collector after some tensioning of the attaching device.

* * * * *